(No Model.) 3 Sheets—Sheet 2.

N. STURDY.
POTATO PLANTER.

No. 496,707. Patented May 2, 1893.

WITNESSES:
Chas. Niola.
C. Sedgwick

INVENTOR
N. Sturdy
BY Munn & Co.
ATTORNEYS.

(No Model.) 3 Sheets—Sheet 3.
N. STURDY.
POTATO PLANTER.
No. 496,707. Patented May 2, 1893.
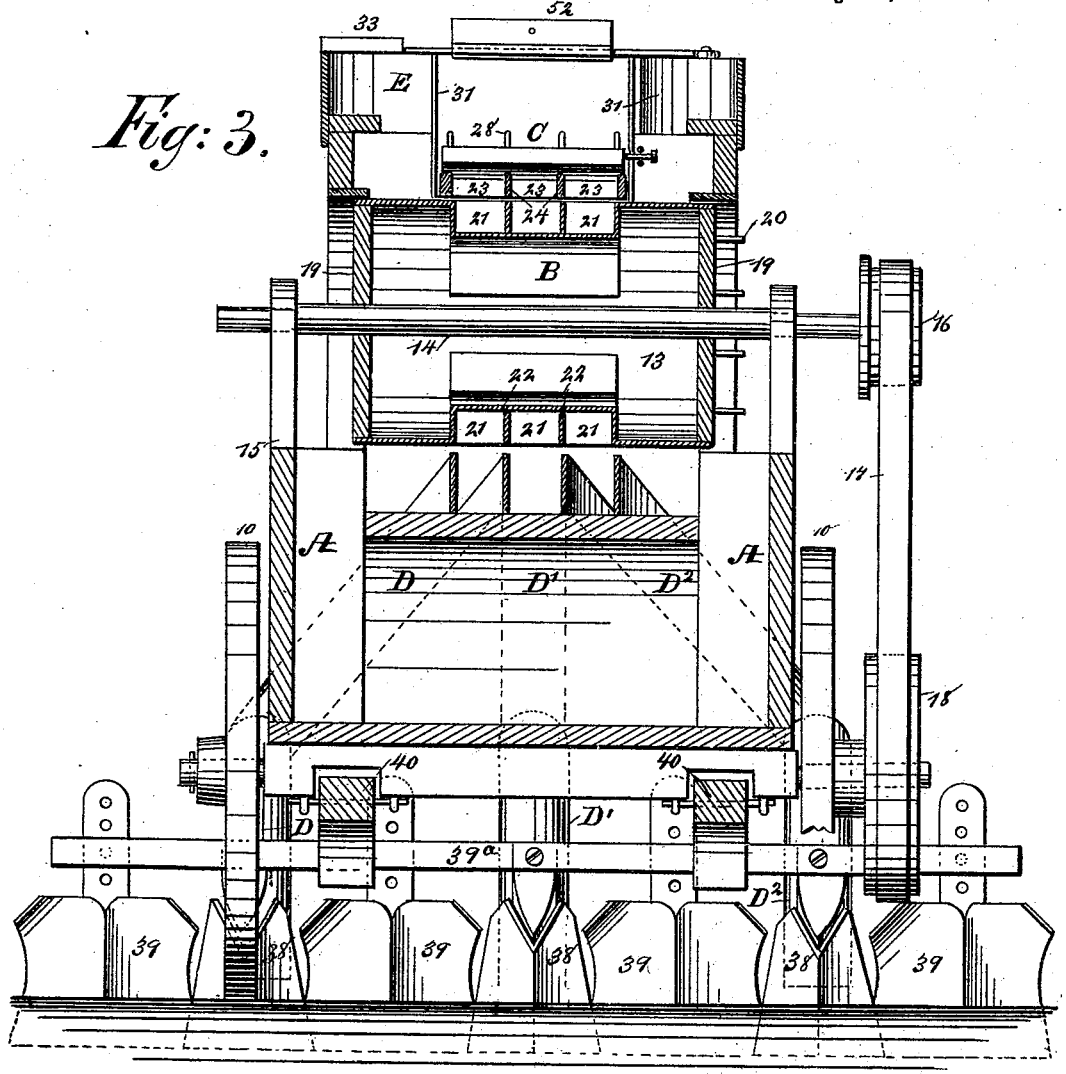
Fig: 3.
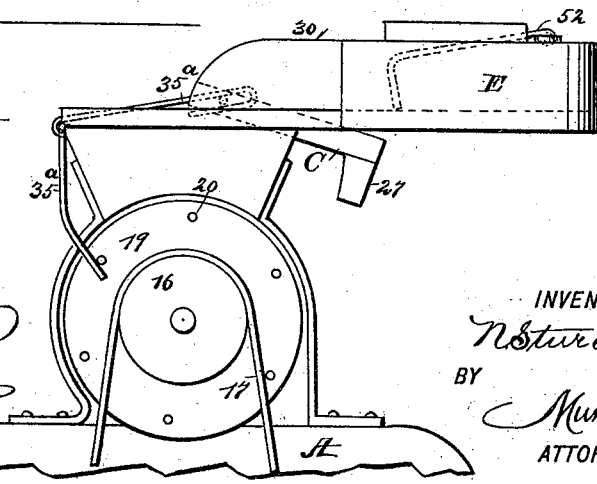
Fig: 4.
WITNESSES:
Chas. Nies.
C. Sedgwick.
INVENTOR
N. Sturdy
BY
Munn & Co.
ATTORNEYS.

UNITED STATES PATENT OFFICE.

NATHAN STURDY, OF CHICAGO, ILLINOIS.

POTATO-PLANTER.

SPECIFICATION forming part of Letters Patent No. 496,707, dated May 2, 1893.

Application filed December 14, 1892. Serial No. 455,126. (No model.)

*To all whom it may concern:*

Be it known that I, NATHAN STURDY, of Chicago, in the county of Cook and State of Illinois, have invented a new and useful Improvement in Potato-Planters, of which the following is a full, clear, and exact description.

My invention relates to an improvement in potato planters, and has for its object to provide a machine adapted to be drawn by a single horse or by a team, and which is also so constructed that the potatoes will be automatically fed from the hopper to a feed device as the machine is drawn forward, and delivered by the feed device to traveling pockets, which pockets in turn deliver the seed potatoes to chutes, through the medium of which the said potatoes are conducted to the ground and dropped into furrows, the furrows being produced in the ground as the machine advances and while the feeding operation is taking place.

A further object of the invention is to construct the machine in such manner that immediately after the potatoes are dropped into the furrows the earth will be covered over them.

Another object of the invention is to construct a machine capable of performing the above named functions and which will be made in a simple, durable and economic manner, and to provide a means whereby the plows and covering blades may be raised from the ground when it is desired to plant, and whereby further the flow of potatoes to the feed device may also be stopped at that time.

The invention consists in the novel construction and combination of the several parts, as will be hereinafter fully set forth and pointed out in the claims.

Reference is to be had to the accompanying drawings forming a part of this specification, in which similar figures and letters of reference indicate corresponding parts, in all the views.

Figure 1:
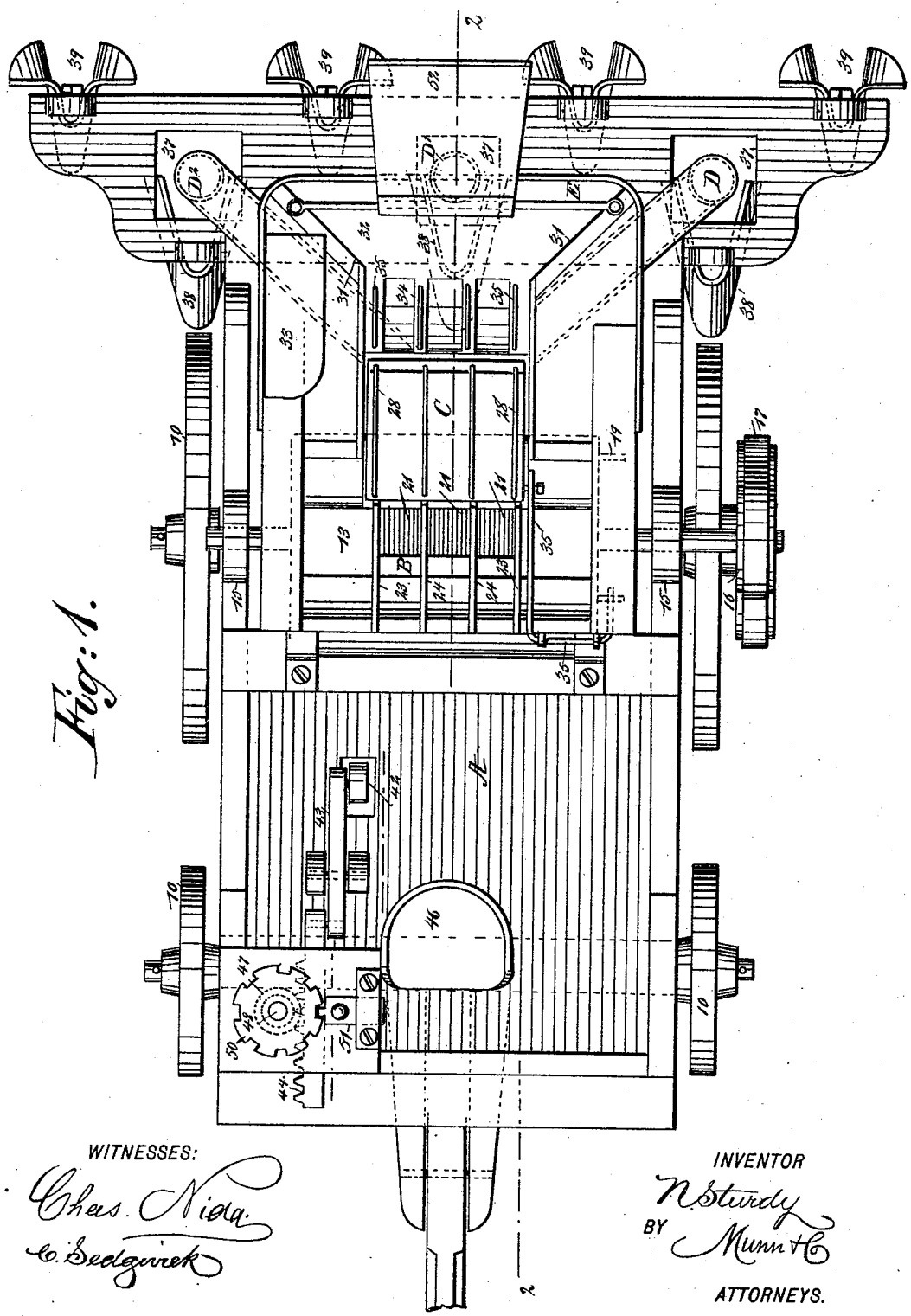
Figure 2:
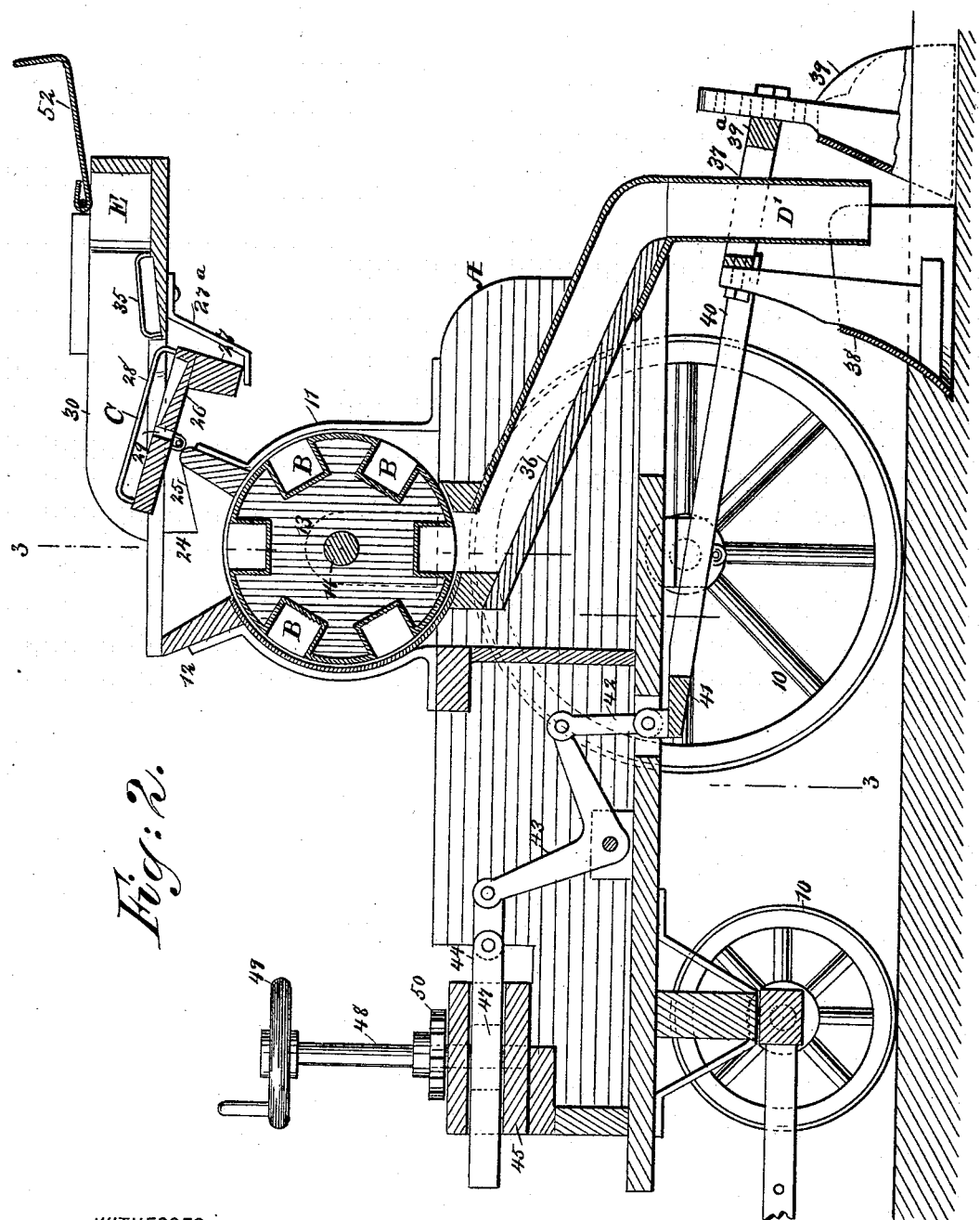

Figure 1 is a plan view of the machine. Fig. 2 is a longitudinal vertical section taken essentially on the line 2—2 of Fig. 1. Fig. 3 is a transverse vertical section taken essentially on the line 3—3 of Fig. 2; and Fig. 4 is a detail view, illustrating the manner in which the feed mechanism of the machine is driven.

In carrying out the invention the body A, which resembles a wagon body, is mounted upon suitable wheels 10. Ordinarily four wheels are employed, but only two may be used if in practice it is found desirable. When four wheels are used the rear wheels are much larger than the front wheels, being preferably twice the diameter of said wheels.

A casing 11, is erected upon the body A, transversely thereof and preferably near its rear portion, and this casing is provided with an open top, which open top is surrounded by a hopper 12. Within the casing 11 a drum 13, is held to revolve, the said drum being preferably mounted upon a shaft 14, which shaft is journaled ordinarily in uprights 15, projected upward from the sides of the body. The shaft which carries the drum 13, is provided preferably at its left-hand extremity with a pulley 16, and this pulley is connected by a belt 17 with a large wheel 18, secured to or constituting a portion of the left-hand rear supporting wheel 10, as shown in Fig. 3. The drum is preferably hollow, being constructed of sheet metal, and the drum is provided at each end with a head 19, preferably made of wood. The left-hand head carries a series of pins 20, as is likewise best shown in Fig. 3. The drum has a series of chambers B, produced in its peripheral surface. The chambers are ordinarily six in number, are made longitudinally in the drum and are located at the central portion thereof; the number of pins 20 in the head of the drum is made to correspond to the number of chambers B in the drum, one pin being located opposite the end of each drum chamber. Each drum chamber is also preferably divided into three pockets or compartments 21, the division being accomplished through the medium of two partitions 22, the partitions being spaced so as to render the compartments 21 of equal size.

The hopper 12, is divided centrally into three compartments 23 through the medium of partitions 24, and the pockets register with the pockets or compartments in the drum when the pockets or compartments are brought to the uppermost position. The partitions 24, are shown in Figs. 1, 2 and 3, and each partition at its rear upper edge has a downwardly and forwardly inclined recess 25, produced in it, as best shown in Fig. 2, these recesses being adapted to receive a feed device C. The feed device consists of a table 26, which is mounted upon the rear side edge of the hopper 12. The table is centrally pivoted or hinged upon the hopper in such manner that when the table is forwardly and downwardly inclined it will enter and practically fill the recesses 25 in the hopper partitions; the rear end of the table is provided with a weight 27, which normally holds that end downward, tilting the forward end of the table upward; but a spring may be substituted for the weight if in practice it is found desirable. The table is adapted to receive the seed potatoes, and upon its upper surface the table is provided with a series of transverse partitions 28, preferably of a skeleton character, in order that dirt may readily escape from the table; the table partitions divide the table into a series of compartments corresponding in number and location to those contained in the hopper; in fact, the ends of the hopper partitions at their recessed portions, are adapted to abut, or practically so, with the ends of the table partitions. To facilitate the speedy disposal of dirt that may be delivered to the table with the potatoes, an outlet opening 29, is produced in the table, but more than one of these openings may be provided if necessary. The partitions in both the table and the hopper are placed at such distances apart as to receive the potatoes endwise only, it being impossible for a potato to travel over the table or enter the hopper crosswise thereof.

A platform E, is located at the rear of the hopper, and is attached to said hopper, the platform being provided with a marginal flange 30 of desired height; and the platform is further provided with two angular partitions 31, located one at each side, the partitions extending from the rear corners of the platform diagonally inward, as shown in Fig. 1, and then longitudinally in a forwardly direction in a parallel line with the table C. By this means an angular chamber 32 is formed upon the platform in which the potatoes to be planted are placed; and a seat 33, is located preferably at one side of the platform, upon which the attendant may be seated to assist in the forward feed of the potatoes in the event their movement should become too slow, or be stopped. The bottom of the chamber 32, is inclined downward in direction of the table, and the opening through which the weighted end of the table passes is produced in the platform, as shown in Fig. 2. That portion of the platform, as is likewise shown in Fig. 2, adjacent to the table, is decidedly downwardly inclined, and a series of ribs 34, is produced upon this inclined portion, as shown in Fig. 1, the ribs being in alignment with the partitions upon the table, and each rib carries a skeleton partition 35 of like character to the table partition, and in alignment with the latter. By this means the potatoes to be delivered to the table are made to travel endwise before they reach the table. The table is rocked as the drum revolves through the medium of a lever $35^a$, attached to the table near the front portion of one end, the lever being carried forwardly and then outwardly and downwardly until its lower end is brought within the path of the pins 19 upon the drum head, as shown in Fig. 4. It is evident that each time a pin contacts with the lever the table will be rocked forwardly and downwardly, and the moment that the lever is freed from the pin it assumes its normal or downwardly and rearwardly inclined position. In the latter position it receives potatoes to be delivered and in the former position delivers the potatoes received into the hopper, from whence they are conveyed into the uppermost pockets of the drum. Thus it is obvious that three potatoes will be delivered to the drum at each forward movement of the table; consequently, three potatoes will be simultaneously discharged from the drum to be planted, and these potatoes are to be distributed in different rows, whereby the machine will plant three rows of potatoes at the same time; but I desire it to be distinctly understood that the machine may be constructed to plant potatoes in two, four or more rows at the same time, if in practice it is found advisable or desirable.

Beneath the drum a platform 36, is located in the body of the machine; this platform is given a rearward and downward inclination, and terminates about flush with the rear end of the body, as shown in Fig. 2. Three chutes D, D' and $D^2$, are supported upon this platform. The chutes converge at their upper ends, as shown in Fig. 3, the location of the said upper ends being such that one chute will be immediately beneath each pocket of the lowermost chamber in the drum, as shown in Fig. 3. At their lower ends the outer chutes converge, while the intermediate chute is preferably made to extend in practically a straight line downward. Each chute at its lower end is provided with a delivery tube 37, which is carried downward to within a proper distance of the ground. The furrows are made and the covering of the potatoes performed, the first operation through the medium of plows 38 and the latter through the medium of covering blades 39. These blades and plows are supported upon a head $39^a$, apertured to permit the downward passage of the delivery tubes of the chutes D, D' and $D^2$; and the head is provided preferably near each end with an attached tongue 40, extending forwardly and upwardly beneath the body of the machine, the tongues being pivotally attached, as illustrated in Fig. 3, upon the rear axle of the machine. The tongues are connected at their forward ends by means of a cross bar 41, which cross bar is pivotally connected with one end of a link 42, the other extremity of the link being attached to one end of an elbow or bell crank lever 43, fulcrumed upon the bottom of the body. The other member of the lever is pivotally connected with a rack 44, having sliding movement in guide ways 45, located preferably at one side of the forward portion of the machine and convenient to the driver's seat 46. The teeth of the rack are engaged by a pinion 47, secured upon an upright shaft 48, journaled in the slide-ways and provided at its upper end with a hand wheel 49. The shaft 48, is also provided with a ratchet wheel 50, to be engaged by a dog 51, as shown in Fig. 1, the dog being preferably operated by the foot of the driver. Thus by the manipulation of the hand wheel 49 the head carrying the covering blades and plows is raised and lowered as occasion may demand; and I desire it to be understood that other forms of lifting devices may be employed in connection with the head if in practice it is found necessary.

The plows 38, are ordinarily attached to the forward edges of the head, and are so located that one is in advance of each discharge tube 37, and the covering blades 39, are attached to the rear edge of the head, they being so placed that one of the blades will be located at each side of a discharge tube and at the rear of it, as shown in Fig. 1. The covering blades need not extend down as far in the ground as the plows, as shown in Fig. 2; and the attachment of both the plows and the covering blades to the heads may be made adjustable. In the event it is desired to stop planting, a stop plate 52, which is pivoted centrally upon the rear portion of the platform E, is thrown downward to the dotted position shown in Fig. 4, in which position the forward end of the stop plate is immediately opposite the rear end of the table, and it closes the delivery end or mouth of the storage compartment 32.

In the operation of the machine, as it is drawn forward the potatoes flow from the storage compartment 32 and enter the spaces between the partitions 35 in that compartment endwise; the potatoes in groups of three are then delivered to the table C, and from the table the potatoes are delivered to the pockets in the drum as the pockets are presented at the hopper, and as said pockets are carried downward opposite the upper ends of the troughs D, D′ and D², a potato is delivered to each of the troughs and passes down the trough receiving it to a furrow made by the plow 38 in front of the outlet of that trough, and the dirt or earth is then immediately placed over the planted potato by means of the covering blades 39 following the plow.

The machine is exceedingly simple, durable and economic in its construction, and will simultaneously plant three rows of potatoes in perfect form.

It will be understood that the drum need not necessarily be made as illustrated, and that instead of the head of the drum being utilized to trip the lever 35 a wheel carrying pins may be substituted for the head. The drum may be driven by any form of belt or by a ratchet wheel and chain; and as shown in Fig. 2 the tilting table 26 may have its downward movement limited by a stop 27ᵃ to insure the potatoes passing singly upon the table.

Having thus described my invention, I claim as new and desire to secure by Letters Patent—

1. In a machine of the character described, the combination, with a rotary drum having a series of pockets contained therein, of a storage platform, a bodily movable feeding device operating in the platform and over the drum, and delivery chutes into which the drum discharges, as and for the purpose set forth.

2. In a machine of the character described, the combination, with a drum having rotary movement, said drum being provided with a series of pockets, a hopper located above the drum, and a vertically rocking feed table pivoted upon the hopper, of delivery chutes registering with the pockets in the drum, a driving mechanism, and a connection between the driving mechanism and the table, whereby the latter is given a rocking motion, as and for the purpose set forth.

3. In a machine of the character described, the combination, with a drum provided with a series of chambers, said chambers being divided into pockets, a hopper also provided with pockets adapted to register with those in the drum, and a vertically rocking table pivoted upon the hopper having divisions corresponding to those in the hopper, of delivery chutes registering with the pockets in the drum, and plows and covering blades arranged adjacent to the outlet ends of the delivery chutes, substantially as shown and described.

4. In a machine of the character described, the combination, with a drum having rotary movement and provided with a series of pockets, a hopper located over the drum, divided likewise into a series of pockets registering with those in the drum, and a table having divisions corresponding to those in the hopper, the table being pivoted upon the hopper, of a storage platform inclined in direction of the table, delivery chutes registering with the pockets in the drum, plows located in front of the delivery end of the delivery chutes, covering blades located at each side of the rear portion of the delivery chutes, the plows and covering blades being vertically adjustable, and a driving mechanism actuating the drum and a trip mechanism imparting rocking movement to the table, as and for the purpose specified.

5. In a machine of the character described, the combination, with a drum provided with a series of pockets produced in its peripheral surface, a hopper located above the drum having partitions therein forming divisions corresponding to those in the drum, a table mounted to rock upon the hopper and provided with divisions corresponding to those in the hopper, and a storage platform surrounding the table and provided with guides extending in direction of the table, of a series of delivery chutes located beneath the drum and adapted to register with its pockets, a plow located in front of the delivery end of each delivery chute, covering blades located at the rear of each of the chutes, the covering blades and plows being vertically adjustable, a driving mechanism connected with the shaft of the drum, a lever connected with the table, and a disk provided with projections adapted for engagement with the lever and to trip the same, as and for the purpose set forth.

NATHAN STURDY.

Witnesses:
WM. J. FLOWERS,
JAMES MCCORMICK.